United States Patent [19]

Smith et al.

[11] 3,864,617

[45] Feb. 4, 1975

[54] CHARGE CONTROL MEANS FOR MOTIVE POWER BATTERY CHARGER

[75] Inventors: Howard A. Smith; William E. Renick, both of Raleigh, N.C.

[73] Assignee: ESB Incorporated, Philadelphia, Pa.

[22] Filed: July 12, 1973

[21] Appl. No.: 378,788

[52] U.S. Cl. .................... 320/23, 320/32, 320/39
[51] Int. Cl. .............................................. H02j 7/10
[58] Field of Search ............ 320/32, 37, 38, 39, 40, 320/48, 22–24

[56] References Cited
UNITED STATES PATENTS

| | | | |
|---|---|---|---|
| 3,090,904 | 5/1963 | Jensen | 320/37 X |
| 3,153,186 | 10/1964 | Medlar | 320/38 X |
| 3,593,099 | 7/1971 | Scholl | 320/48 X |
| 3,688,177 | 8/1972 | Reeves | 320/39 |
| 3,755,729 | 8/1973 | Kuttner | 320/32 X |

*Primary Examiner*—William H. Beha, Jr.
*Assistant Examiner*—Robert J. Hickey

[57] ABSTRACT

A battery charger is equipped with a current adjusting device. A current sensor continuously measures the current output from the charger and feeds the readings to a current comparator. The terminal voltage of the battery is also continuously read and the readings are fed to a voltage comparator. A voltage reference feeds a constant reference voltage to the voltage comparator. The voltage comparator compares the battery voltage with the reference voltage and feeds a signal dependent upon the voltage difference and in accordance with a preselected program to a current reference. The current reference delivers a signal dependent on the output of the voltage comparator and in accordance with a preselected program to the current comparator. The current comparator to the the signal received from the current sensor tothe signal received from the current reference and provides an output signal to cause the current adjusting device to adjust the charging current to the values called for by the preselected program. A typical charge program which can be selected is a first charging mode at the initial charge rate of the battery until the battery voltage rises to a preselected value slightly below the gassing voltage. This is followed by a second charging mode wherein the charging current is gradually diminished so as to hold the voltage constant at the preselected value. When the charging current drops down to the finishing rate of the battery, a third mode commences wherein the current is held at the finishing rate regardless of further increase of the battery voltage. The charge can be terminated by a timing device set for total charge time or alternately for a predetermined charge period at the finishing rate.

6 Claims, 5 Drawing Figures

CHARGE CONTROL MEANS FOR MOTIVE POWER BATTERY CHARGER

BACKGROUND OF THE INVENTION

1. Field of the Invention

This invention relates to storage battery chargers. In particular, it relates to a storage battery charger operating on a preselected charge program.

2. Description of the Prior Art

The lead acid storage battery is a particularly versatile power supply. It can deliver the electrical power stored within under widely different requirements of demand, continuously or intermittently, at the complete will of the user. Similarly, it can be recharged under widely different conditions from low current rates to very high current rates. However, when a storage battery must be used daily, as for instance as the power supply for an industrial truck, it has been found that best battery operation requires a uniform and controlled charge regime following a rather narrow set of parameters.

Lead acid storage batteries have been in use for many years. The charging requirements for maximum storage battery capacity utilization and life are well understood and have been repeatedly verified by direct experience.

Important points that must be considered in the design of a storage battery charger, particularly for motive power service, include:

a. The battery must receive a full charge, including the power removed, plus an excess charge after each discharge. It also requires periodic "equalizing" charges of somewhat longer duration. If the battery does not receive regular full charges, its ability to store energy is slowly and often irreversibly lost. If it receives too much charge, its life is shortened by corrosion reactions.

b. In the initial period of charge, the battery can safely accept higher charge currents than at the end of charge. However, it is important that the charge rate in the initial portions of the charge do not exceed the "gassing" voltage of the battery. If gassing occurs before the battery has approached full charge, the service life of the battery may be shortened. When the battery has become fully charged, a certain amount of gassing at a controlled and proper rate is desirable as it stirs and mixes the electrolyte and avoids electrolyte stratification.

c. High charge rates as well as high rates of discharge cause the battery temperature to increase. If the battery temperature is not controlled, the life of the battery can be drastically reduced. Maximum temperature for reasonable life should be held below 120°F., and average temperatures below 100°F.

d. Because of the widespread use of an 8-hour working shift in this country, a convenient time of charge is limited to 8 hours or somewhat less.

e. The battery should not be fully discharged at the end of a work period nor can it be expected to be discharged to the same degree after each work period. It has been found very difficult to measure the power removed from a storage battery with sufficient accuracy to meet the requirement of (a) above.

f. The cost of a battery charger is largely determined by the maximum current it must deliver. Therefore, it is desirable to make the charger as small as possible within the parameters given above.

g. The size of a storage battery may be given in terms of the number of cells and the ampere hour capacity of each cell. The ampere hour capacity depends on the rate at which current is withdrawn and therefore a time of discharge must also be stated. Batteries for motive power use are often rated at the 5 hour or 6 hour discharge capacity. For best service, i.e., life, batteries should only be discharged regularly to about 80 percent of the rated 5 or 6 hour ampere hour capacity.

h. A charge regime or program that has stood the test of time comprises an initial charge period at a current rate (in amperes) about equal to 18/100 to 22/100 times the ampere hour capacity of the cell. This value in amperes is often termed the initial charge rate of the cell. The charge is given at this rate until the battery approaches the gassing voltage as indicated by a cell voltage value of about 2.35 – 2.38 volts per cell. A large portion of the charge is returned in this initial charge period. When the voltage reaches the chosen value, the current is gradually reduced so as to hold the voltage constant at the chosen value. The current is reduced in this manner until it has dropped to value (in amperes) about equal to 4/100 – 6/100 times the ampere hour capacity of the cell, a value often termed the finishing rate of the cell. This value of current is held constant for a preselected time period, at the end of which the battery is fully charged. Making use of this schedule, a properly used battery can be recharged in approximately 8 hours.

Many battery chargers have been designed and constructed to give a charge approximating this or similar charge regimes. These range from motor generator devices having a current characteristic which tapers rapidly downward as the output voltage rises to two rate static type chargers with voltage controlled changeover from the high current to low current. Presently, known chargers often make use of timing clocks which either time the total charge period or time the period at which the battery is on the low rate portion of the charge.

Many presently available chargers are sensitive to the voltage of the power feed lines causing them to provide an uncertain and sometimes harmful recharge. Many chargers make use of voltage sensitive relays. These devices often have been found to be erratic in operation especially where vibrations are present. Presently available chargers with overly simplified circuits often do not meet the standards required to provide adequate charging, whereas other presently available chargers are overly complicated and costly in terms of the duty which they perform. It is well known that the charge voltage of a fully charged storage battery is not entirely repeatable. It is directly dependent upon the rate of charge at the time the reading is made. It is inversely dependent upon the battery temperature. It normally decreases as the battery ages. The gassing voltage of a storage battery does not change to any great extent with battery age. Charging devices which utilize the gassing voltage as a control point are subject to fewer uncertainties than those based upon the full charge voltage point.

Although the lead-acid battery system is the most widely used couple for storage batteries, other battery systems are known and have seen extensive use. These include the nickel iron system and the nickel cadmium system as well as such systems as the silver zinc battery, the alkaline manganese battery the nickel zinc battery, etc. The requirements for charging these batteries differ one from another and from the lead acid battery requirements as discussed above. In general the requirements are more stringent and exacting than for lead acid cells. Charging devices for storage batteries tend to be designed for one specific battery type and for one particular battery size or at least a limited range of battery sizes.

SUMMARY OF THE INVENTION

A storage battery charger is equipped with a conventional electrically controlled charge current adjusting means. A voltage comparator compares the battery voltage to a reference voltage and provides output signals based upon the comparison. The output of the voltage comparator is fed to a current reference which provides a current reference signal related to the battery voltage in accordance with a preselected charge program. The current reference signal is fed to a current comparator. A current sensor in the charge current circuit of the charger also feeds a signal proportional to the output of the charger to the current comparator. The current comparator compares the signal from the current sensor with the signal from the current reference and provides an output signal which causes the current adjusting means to adjust the current to equal the current demanded by the preselected charge program.

A desirable charge program comprises a first charge mode at a first preselected current until the battery voltage rises to a preselected value slightly below the gassing point. A second mode then commences wherein the current is gradually reduced so as to hold the preselected voltage. When the charge current is reduced to a second preselected rate, lower than the first, the voltage limitation is removed and the current is held at the second rate until completion of the charge. During this portion of the charge, the voltage rises according to the characteristics of the individual battery. The charge may be terminated by means of a timing device.

From this summary, it can be seen that the requirements for optimum charging have been met with a simple straight forward concept based upon a combination of current and voltage control. The several functional units named above can be implemented with presently available electronic components to provide a completely non mechanical control. A principle feature of the present invention is that it includes the continuous control of the charging current. Thus, in the fixed current portions of the charge program the control automatically corrects for line voltage fluctuations, etc. Likewise, in the voltage controlled portion of the program, line voltage changes are not passed along to the battery.

Although the description above is directed to a charging device for lead acid motive power batteries, the invention is not so limited and can be used to advantage for charging lead acid batteries other than for motive power use as well as lead and non-lead acid storage battery types for all purposes.

DESCRIPTION OF THE PREFERRED EMBODIMENT

Figure 1:
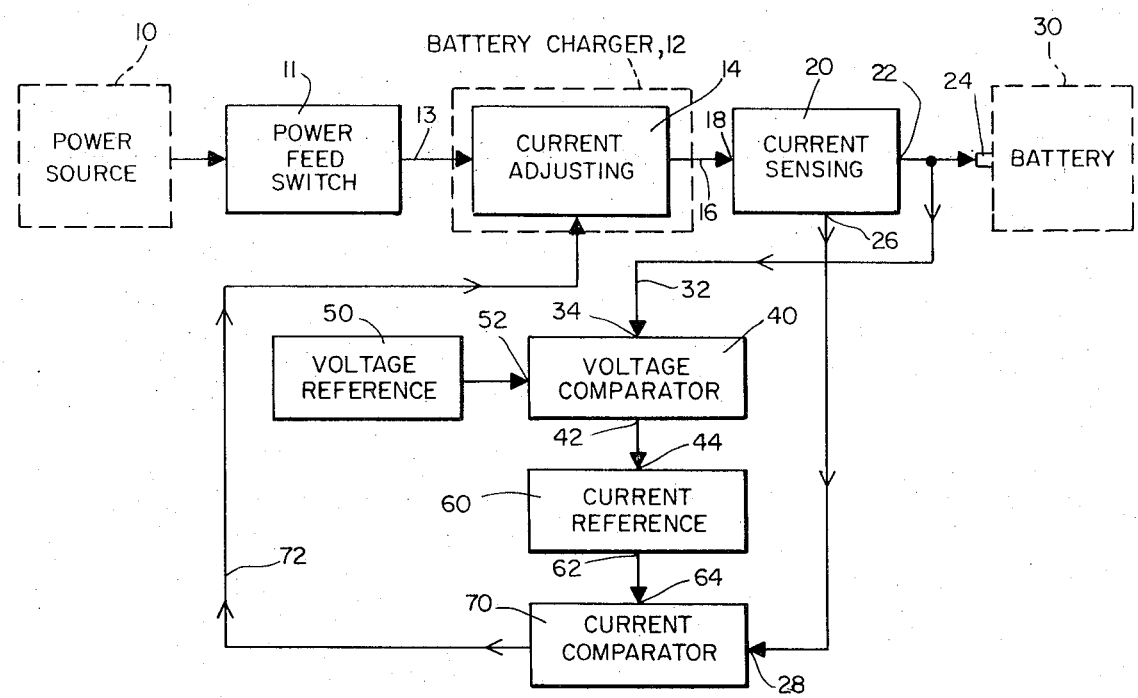
FIG. 1 depicts the charger of the invention in block form.

In FIG. 1, 10 indicates a power source supplying power to a battery charger 12. A power feed switch 11 or line contactor is operatively connected between the power source and the functional portions of the charger 12. The switch may be located within the charger cabinet or it may be separate therefrom. The charger 12 is of any normal design such as a transformer-rectifier, a motor generator, or even a direct current bus and resistor, as required to provide a direct current suitable for charging a battery of a particular voltage and maximum current demand. An electrically operated current adjusting means 14 forms a necessary part of the charger 12. Typical current adjusting means include such devices as motor driven autotransformers, motor driven rheostats, magnetic amplifiers, saturable reactors, transistor circuits, thyristors, etc. These devices can be divided into three general groups, those requiring a continuous but varying current to provide control, those requiring occasional error correcting power pulses in either forward or reverse direction, and those requiring a continuous flow of control pulses. The current adjusting means may be located in the input side or the output side of the battery charger as required by its mode of operation.

The output 16 of the charger 12 is connected to the input 18 a current sensing means 20. A usual current sensing means is an ammeter shunt placed in the charger-battery circuit; however, direct current transformers or transducers may also be used for current sensing. An amplifier may be included in the current sensing means. The current output 22 of the current sensing means is connected to the terminals or terminal plug 24 of the storage battery 30. Voltage leads 32 are connected to an appropriate point normally as close to the battery as possible in the charger-battery circuit to provide a voltage approximately equal to the battery voltage. Leads 32 also connect to the input 34 of a voltage comparator 40. A voltage reference 50 feeds a steady reference voltage to a second input 52 of the voltage comparator 40. The voltage comparator 40 compares the battery voltage as shown on leads 32 to the reference voltage as shown on leads 52 and provides a first reference signal at its output 42. Output 42 of the voltage comparator is connected to the input 44 of a current reference 60. The current reference 60 supplies a second reference signal at its output 62 whose magnitude is related to the signal received by the input thereof in accordance with a preselected charge program relating a desired charging current to the battery voltage. The second reference signal is proportional to the desired charge current. The output 62 of the current reference 60 is connected to the input 64 of a current comparator 70. The sensing output 26 of the current sensing means 20 feeds a third reference signal whose magnitude is proportional to the battery charging current to a second Input 28 of the current comparator 70. The current comparator 70 compares the signal received from the current sensor 20 to the signal received from the current reference. The current comparator 70 provides a control signal to the current adjusting means 14 by connection 72. This control signal, supplied to the current adjusting means 14, is such as to cause the third reference signal received from the current sensing means 20 to continuously equal the second reference signal received from the current reference 60 and thereby cause the battery charging current to equal the charging current called for by the preselected program set into the current reference 60.

In a particular charge program, termed here a three mode charge, the charge starts out at a fixed current equal to the initial charge rate of the battery. This continues until the battery voltage rises to a value slightly below the gassing voltage equivalent to about 2.35 – 2.38 volts per cell. The charge current then is slowly reduced so as to keep the battery voltage equivalent to this value. When the current has dropped to the finishing rate for the battery, the voltage control is removed and the charge continues at the finishing rate until terminated by a timer or other means.

This particular three mode charge differs from other charge programs in that during the fixed current portions of the charge the current is accurately maintained at the preselected value throughout the charge period. It does not taper as a result of a rise in battery voltage nor does it change due to instantaneous or long term fluctuations of the power feed. This is because of the use of the current sensing feed-back loop as shown by block 20. Because of the close current control maximum current values may be chosen for the charge program without need for a broad "safety margin" as is otherwise necessary. Because of the absence of taper—particularly in the initial charge step—the charge is returned to the battery in the shortest possible time.

Figure 2:
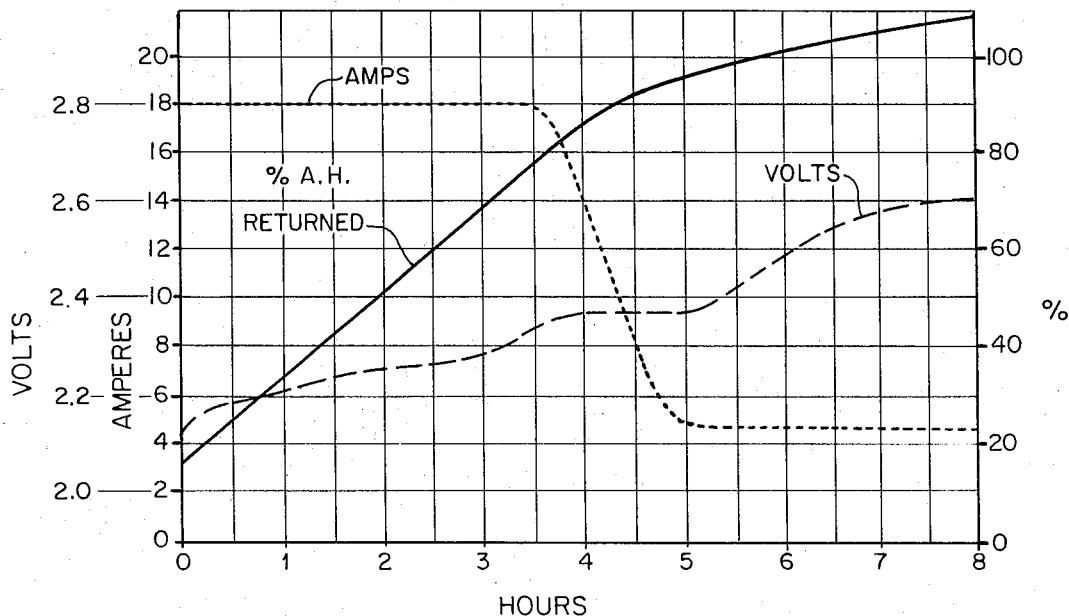
FIG. 2 is a graph of the charge of a typical battery using a preferred charge program.

Typical charge curves for a storage battery receiving a charge in accordance with the preferred program as described above are depicted in FIG. 2 and show the relationship of current, voltage and charge returned with respect to time. The three charging modes are clearly distinguishable, a first constant current portion at the initial charge rate from 0 to 3 ¾ hours, a second constant voltage portion from 3 ¾ hours to 5 hours, and a third portion comprising a charge at the finishing rate from 5 hours to 8 hours.

Although the termination of the charge can be left to an operator, automatic charge termination means are in general preferred by today's battery users. There are numerous charge termination systems which may be used with the battery charger of the invention, two systems each based on the use of an electric timer, will be described as particularly illustrative.

Figure 3:
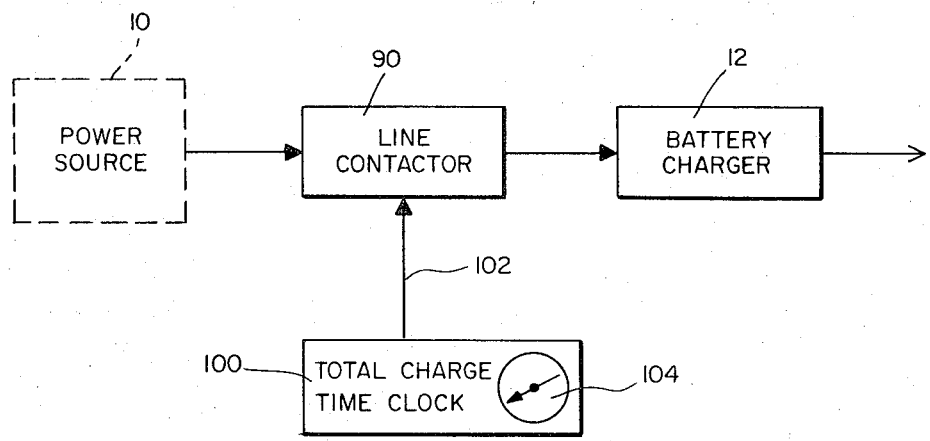
FIG. 3 depicts in block form a second embodiment of the invention.

In FIG. 3, a portion of the block diagram of FIG. 1 is shown to which has been added a total charge time limiting clock, of a type readily available on the market.

A line contactor 90 connects the power source 10 to the charger 12. A total charge time clock 100 is operatively connected to the control coils of the contactor via leads 102. In a particular type of timer, a dial and knob as shown at 104 is provided. Turning the knob to a particular point on the dial automatically energizes the clock output and leads 102. To operate the charger the user first connects his battery to the charger circuit by means of the terminal plug 24. He then rotates the knob 104 to a suitable time interval. This causes contactor 90 to close and initiate the charge. The charge will terminate by the opening of the contactor 90 when the timer has measured the selected time interval. For this operation the timer can well be set at about 8 hours. During this period the charge will progress through the desired three modes as dictated by the voltage use of the battery. A boost charge may be provided by, for instance, setting the timer to 12 hours to give 4 hours extra charge.

Figure 4:
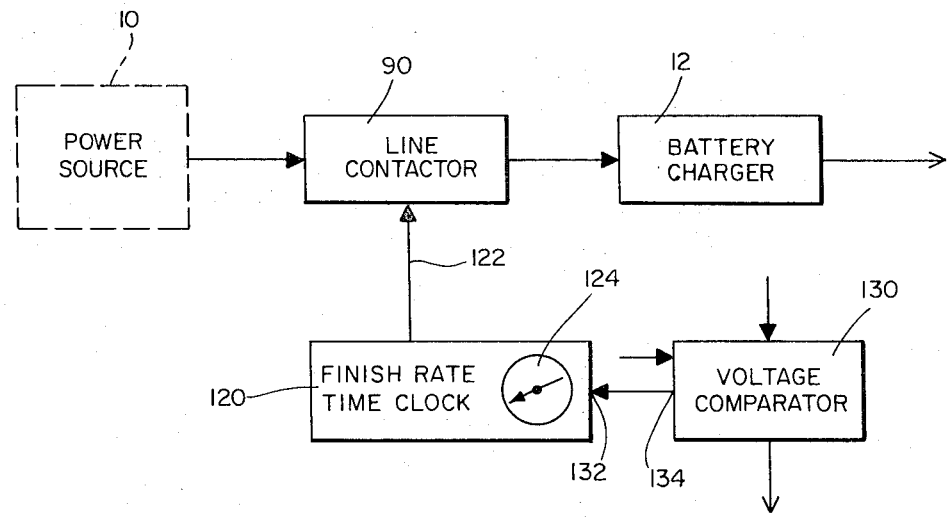
FIG. 4 depicts in block form a third embodiment of the invention.

The second means of automatic charge termination to be described is shown in block diagram FIG. 4. Power source 10 is connected via line contactor 90 to the battery charger 12. A finish rate time clock of a type readily available on the market 120 is operatively connected to the contactor 90 via leads 122. The finish rate time clock 120 is equipped with dial and knob 124. It also is equipped with an internal starting means operated by leads 132. Input 132 is shown attached to an output 134 of voltage comparator 130. The internal construction of the timer 120 is such that when the knob 124 is rotated, the output 122 will become energized. When the input 132 is energized by a suitable signal from output 134 of the voltage comparator the time clock is activated. The time clock will time out the time period selected by knob 124 at which time it will de-energize the output leads 122.

In the operation of this form of charge terminator, the operator first connects his battery to the terminal plug 24. He then turns the knob 124 to a desired finish rate charge time. This causes the contactor 90 to close and the charge commences. When the charge has progressed to the start of the third mode, for instance, a signal passes from the voltage comparator 130 to the timer causing the clock to start. The charge terminates when the timer has run its course and de-energizes lead 122.

The first charge termination means is suitable where the battery is used approximately the same amount every day, or else where the operator can determine with accuracy the amount of use the battery has received. The second termination means is suitable for such services but also is suitable for charging a battery whose duty differs from day to day.

Figure 5:
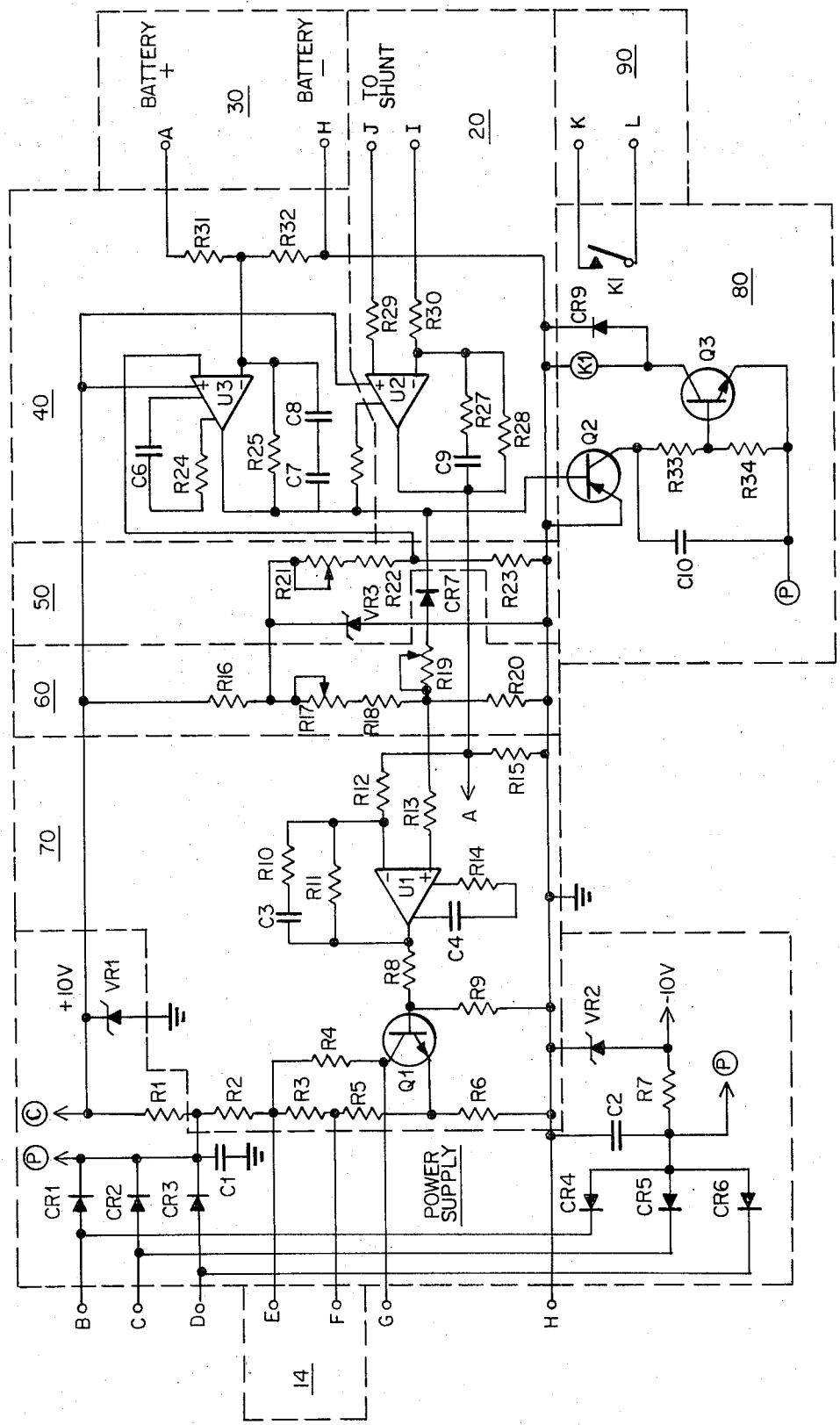
FIG. 5 depicts in schematic form a particular embodiment of the charger shown in block form in FIG. 1.

FIG. 5 shows in diagramatic form the details of a control circuit embodying the features of the present invention as adpoted for use with a 3 phase battery charger having magnetic amplifiers for current control located in the alternating current part of the charger. The blocks of FIG. 1 are outlined in dashed lines in FIG. 5. The block numbers of FIG. 1 are shown in the blocks of FIG. 5 and are underlined for convenience in reading.

Referring to FIG. 5, a three phase low voltage control current supply feeds terminals B, C, D, and H. This is rectified by diodes CR1 through CR6. Capacitors C1 and C2 along with resistors R1 and R7 and Zener diodes VR1 and VR2 serve to filter the rectified current and to control the voltage of the control power supply to +10V and −10V respectively.

The voltage reference 50 comprises the resistors R16, R21, R22 and R23 and the Zener diode VR3.

Battery voltage from terminals A and H is reduced by the voltage divider R31, R32. The reduced voltage is fed to the voltage comparator 40 where it is compared to the voltage of the voltage reference 50. The voltage comparator 40 comprises the operational amplifier U3, resistors R24, R25, and capacitors C6, C7 and C8. The resistors and capacitors provide necessary compensation, gain and stability control for the amplifier U3.

The current reference 60 comprises resistors R16, R17, R18, R19, R20 Zener VR3 and diode CR7.

The current sensing circuit 20 consists of an ammeter shunt (not shown) connected via terminals I and J to the current sensing amplifier, U2. Components C9, R27, R28 and R30 are needed to control stability, ripple filtering and amplifier gain.

Resistor R29 which approximately equals the parallel equivalent magnitude of R28 and R30 is used to provide a balanced input for the current sensing amplifier, U2.

The current comparator 70 comprises operational amplifier U1 and associated circuitry. The output of U1 drives the power transistor Q1. R14, C4, R10 and C3 are compensation and stability network components. Components R16 and VR3 provide a stable voltage supply for the reference signal.

Resistor R11 together with R12 and R13 determine the dc or low frequency gain of the current comparator amplifier, U1.

Resistors R8 and R9, respectively, provide current limiting for the current entering the base of Q1 and "pull down" for the output of U1 which does not have pull down capability. The output section of amplifier U1 consists of a common collector transistor stage with the emitter open, therefore it can "pull up" (go positive) but not pull down (go towards negative).

The current comparator 70 (amplifier U1) compares the signal from the current sensing circuit 20 via junction of resistors R12 and R15 to the voltage of the junction of resistors R18, R19 and R20, all forming a part of the current reference 60. The output of amplifier U1 is such as to cause the signal (i.e., voltage) from the current sensing circuit 20 to equal the signal (i.e., voltage) from the point R18, R19, R20. It does this by feeding a suitable signal via power transistor Q1 to the charging current adjusting means, in this case a magnetic amplifier (not shown), thus adjusting the signal from the current sensing means 20.

Terminals E and F are connected to the current control device, 14, (magnetic amplifier) of the battery charger (not shown). These terminals are biased off via bias windings attached to terminals E and F, and are biased on via control windings attached to terminals G and E. A "see-saw" action takes place between the bias and control currents: the turning of Q1 increases the control (turn-on) current. The network consisting of resistors R2, R3, R4, R5, and R6 is used along with transistor Q1 to see-saw the currents going into the bias and control windings of the magnetic amplifiers (these forming the current adjusting device 14 of FIG. 1) in the charger. With transistor Q1 on (high current condition) voltage is developed across R4 and current there exists in the control winding connected to terminals E and G, and only a small voltage is developed across R3 resulting in a small bias winding current via terminals E and F. With Q1 off (no charger output current) the situation is reversed or see-sawed.

When the battery voltage is below 2.36 volts per cell, the output of U3 is at a high positive potential and diode CR7 is reverse biased. The current reference is thus at the level determined by divider R17, R18 and R20. This causes the charger to deliver a regulated high charging current, for instance, 18 amperes per 100 AH to the battery. If, on the other hand, the battery terminal voltage is above the 2.36 volts per cell, the output of U3 is low and clamped to a negative voltage (equal to $V_{EB}$ of Q2). Diode CR7 now conducts and the current reference signal is "dragged" down via R19 and CR7 such that the charger delivers a regulated low charging current, for instance, 4.5 amperes per 100 AH.

In the portion of the charge where the cell voltage at the high rate would be 2.36 or greater, but where the charge voltage at the low rate would be below 2.36 volts per cell, the charge becomes voltage controlled. The battery charging current tapers from high to low in this region as required to maintain constant voltage. Adjustments R17, R19 and R21, respectively, are used to adjust (or set) the high rate current (18A/100 AH), the low rate current (4.5A/100 AH) and the voltage level of the constant voltage region (2.36 volts per cell).

The timer Start Circuit 80 comprises transistor Q2, Q3, resistors R33 and R34, capacitor C10, diode CR9 and timer start relay having coil K1 and contacts K1. When the point is reached in the charge program where the charge at the finishing rate commences, transistor Q2 just turns on because $V_{EB}$ of Q2 just became forward biased by about 600 mV. This action also turns on Q3, and energizes the coil K1 of the timer start relay. When the coil is energized, contacts K2 are closed thus providing a starting signal for an electric timer (not shown) connectable to terminals K and L. Capacitor C10 and diode CR9 are needed for filtering and transient voltage protection (for Q3) respectively. Resistor R33 and R34 provide a suitable input bias current to base of Q3 when Q2 is conducting.

It is to be particularly noted that the preselected program preferred for the charger control of the invention makes use of parameters developed by the particular battery in its particular state of charge to determine two of the three timing points of the charge program. If a battery has been deeply discharged, the time required to reach the first and second control points will be longer than the time required when the same battery has been only partially discharged.

The above detailed description relates to a particular embodiment of the invention. However, the invention is not limited to the device of the detailed description but includes all embodiments falling under the broader concepts of this disclosure.

Having fully described our invention we hereby claim:

1. In a battery charging device having an input and an output, the input being connectable to a source of power and the output being connectable to a storage battery for supplying a charging current thereto, the improvement which comprises:
   a. a voltage reference having an output;
   b. a voltage comparator having a first input, a second input and an output, the first input being connected to the output of the voltage reference, the second input being connected to the output of the charging device, the comparator comparing the voltage of the battery with the voltage of the voltage reference and producing a first reference signal at its output as a result thereof;

c. a current reference having an input and an output, the input being connected to the output of the voltage comparator the current reference supplying to its output a second reference signal whose magnitude is related to the signal received by the input thereof in accordance with a preselected charge program relating a desired battery charging current to the battery voltage, said second signal being proportional to the desired charging current;

d. a charge current sensor having a current input, a current output and a sensing output, the current input thereof being connected to the output of the charging device, the current output thereof being connectable to the battery to be charged, and the sensing output providing a third reference signal, the magnitude of which being proportional to the magnitude of the battery charging current;

e. a current adjusting device for adjusting the magnitude of the battery charging current, the device having a power input, a power output and a control input, the power input and the power output of the current adjusting device being connected in the charging device so as to provide current thereto, the control input controlling the adjustment of the device; and, f. a current comparator for supplying a control signal to the current adjusting device, the current comparator having a first input, a second input and an output, the first input being connected to the output of the current reference, the second input being connected to the output of the current sensor, and the output being connected to the current adjusting device, the current comparator comparing the third reference signal received from the current sensor to the second reference signal received from the current reference and supplying the control signal as a result thereof, the control signal causing the third reference signal to continuously equal the second reference signal.

2. A charging device as defined in claim 1 wherein the voltage comparator is an operational amplifier having two inputs and one output, and the current comparator is an operational amplifier having two inputs and one output.

3. A charging device as defined in claim 1 including:
a. a line contactor for providing power connections between the power source and the battery charging device, the contactor including a contactor closing means;
b. a timer for measuring a time period having a normal starting means, the timer being operatively connected to the closing means of the line contactor so as to cause the contactor to close when the timer is started and cause the contactor to open when the time period measured by the timer is completed.

4. A charging device as defined in claim 1 including:
a. a line contactor for providing power connections between the power source and the battery charging device the contactor including a contactor closing means;

b. a manually initiated means for energizing the contactor closing means;
c. a timer for measuring a time period and for de-energizing the contactor at the end of the time period the timer including a timer start means and
d. means operatively connecting the timer start means and the current reference so that the timer will be started when a selected point in the charge program is reached.

5. a charging device as defined in claim 1 wherein the means for adjusting the charging current is a magnetic amplifier.

6. In a battery charging device having an input and an output, the input being connectable to a source of power and the output being connectable to a storage battery for supplying a charging current thereto, the charger supplying the battery with a charge current demanded by a preselected charge program, the charge program including a first mode at a first preselected fixed current until the battery voltage rises to a first preselected value, a second mode wherein the current is gradually reduced so as to hold the preselected voltage value and a third mode wherein the charge is completed at a second preselected fixed current lower in value than the first preselected current and the voltage limitation is removed, the improvement which comprises:

a. a voltage reference having an output;
b. a voltage comparator having a first input, a second input and an output, the first input being connected to the output of the voltage reference, the second input being connected to the output of the charging device, the comparator comparing the voltage of the battery with the voltage of the voltage reference and producing a first reference signal at its output as a result thereof;
c. a current reference having an input and an output, the input being connected to the output of the voltage comparator the current reference supplying to its output a second reference signal whose magnitude is related to the signal received by the input thereof in accordance with the preselected charge program relating a desired battery charging current to the battery voltage, said second signal being proportional to the desired charging current;
d. a charge current sensor having a current input, a current output and a sensing output, the current input thereof being connected to the output of the charging device, the current output thereof being connectable to the battery to be charged, and the sensing output providing a third reference signal, the magnitude of which being proportional to the magnitude of the battery charging current;
e. a current adjusting device for adjusting the magnitude of the battery charging current, the device having a power input, a power output and a control input, the power input and the power output of the current adjusting device being connected in the charging device so as to provide current adjustment thereto, the control input controlling the adjustment of the device; and,
f. a current comparator for supplying a control signal to the current adjusting device, the current comparator having a first input, a second input and an output, the first input being connected to the output of the current reference, the second input being connected to the output of the current sensor, and the output being connected to the current adjusting device, the current comparator comparing the third reference signal received from the current sensor to the second reference signal received from the current reference and supplying the control signal as a result thereof, the control signal causing the third reference signal to continuously equal the second reference signal.

* * * * *